(12) United States Patent
de Sylos

(10) Patent No.: US 10,030,340 B2
(45) Date of Patent: Jul. 24, 2018

(54) MACHINE WEIGHT REGULATION SYSTEM

(71) Applicant: ATLAS COPCO CONSTRUCTION TECHNIQUE BRASIL LTDA, Sorocaba-SP (BR)

(72) Inventor: Alexandre Biondi de Sylos, Sorocaba-SP (BR)

(73) Assignee: DYNAPAC DO BRASIL INDÚSTRIA E COMÉRCIO DE MÁQUINAS LTDA (BR)

( * ) Notice: Subject to any disclaimer, the term of this patent is extended or adjusted under 35 U.S.C. 154(b) by 4 days.

(21) Appl. No.: 15/108,539

(22) PCT Filed: Oct. 31, 2014

(86) PCT No.: PCT/BR2014/000395
§ 371 (c)(1),
(2) Date: Jun. 27, 2016

(87) PCT Pub. No.: WO2015/095940
PCT Pub. Date: Jul. 2, 2015

(65) Prior Publication Data
US 2016/0319495 A1 Nov. 3, 2016

(30) Foreign Application Priority Data
Dec. 26, 2013 (BR) .............................. 102013033526

(51) Int. Cl.
*E01C 19/22* (2006.01)
*B62D 49/08* (2006.01)
(Continued)

(52) U.S. Cl.
CPC ............ *E01C 19/22* (2013.01); *B62D 49/085* (2013.01); *B66F 9/07554* (2013.01);
(Continued)

(58) Field of Classification Search
CPC ... B62D 49/085; B66F 9/07554; E01C 19/22; E02D 27/44; E02D 3/026; E02F 9/18
See application file for complete search history.

(56) References Cited

U.S. PATENT DOCUMENTS 2,261,933 A * 11/1941 Flynn ...................... E02D 3/026
                                                                                                             172/548
2,555,792 A * 6/1951 Farr ...................... B60P 1/5433
                                                                                                             212/195
(Continued)

FOREIGN PATENT DOCUMENTS

BR       9502171-0       8/1997       ........... E01B 27/02
DE       29620847        1/1997       ........... E02D 3/026
(Continued)

OTHER PUBLICATIONS

International Search Report (including translation) issued in application No. PCT/BR2014/000395, dated Oct. 12, 2014. (7 pgs).
(Continued)

*Primary Examiner* — Paul N Dickson
*Assistant Examiner* — Timothy Wilhelm
(74) *Attorney, Agent, or Firm* — Hayes Soloway P.C.

(57) ABSTRACT

The present invention relates to machine weight regulation system which comprises one or more ballasts (1); a fastening system (2); and a machine (3) containing a housing; capable of carrying a plurality of types of extra weight.

12 Claims, 6 Drawing Sheets

(51) Int. Cl.
*B66F 9/075* (2006.01)
*E02F 9/18* (2006.01)
*E02D 3/026* (2006.01)
*E02D 27/44* (2006.01)

(52) U.S. Cl.
CPC .............. *E02D 3/026* (2013.01); *E02D 27/44* (2013.01); *E02F 9/18* (2013.01)

(56) References Cited

U.S. PATENT DOCUMENTS

| | | | | |
|---|---|---|---|---|
| 2,820,556 A * | 1/1958 | Davis | ................ | B66C 23/74 |
| | | | | 280/759 |
| 3,003,785 A * | 10/1961 | Straszheim | ........ | B62D 49/0628 |
| | | | | 280/759 |
| 3,032,352 A * | 5/1962 | Barrett | ................ | B62D 49/085 |
| | | | | 180/900 |
| 3,061,034 A * | 10/1962 | Hoyt | ................ | B62D 49/085 |
| | | | | 180/68.5 |
| 3,492,019 A * | 1/1970 | Folkerts | ............. | B62D 49/0628 |
| | | | | 280/759 |
| 3,665,822 A | 5/1972 | Speer | ..................... | 94/50 R |
| 3,709,520 A * | 1/1973 | Johnson | ............... | B62D 49/085 |
| | | | | 280/759 |
| 3,730,545 A * | 5/1973 | Allori | ................ | B62D 49/0628 |
| | | | | 280/759 |
| 3,888,507 A * | 6/1975 | Berghausen | ........... | B60D 1/02 |
| | | | | 280/759 |
| 3,900,272 A * | 8/1975 | Domenighetti | ....... | E01C 19/233 |
| | | | | 404/130 |
| 3,935,921 A * | 2/1976 | Muller | ................ | B60K 5/00 |
| | | | | 180/89.1 |
| 3,944,252 A * | 3/1976 | Barth | ................ | B62D 49/085 |
| | | | | 280/759 |
| 3,991,891 A * | 11/1976 | Cox | ................ | E02F 3/386 |
| | | | | 212/195 |
| 4,094,534 A * | 6/1978 | Welke | ................ | B62D 49/085 |
| | | | | 280/759 |
| 4,232,883 A * | 11/1980 | Bourgeous | ........... | B62D 49/085 |
| | | | | 180/291 |
| 4,322,107 A * | 3/1982 | Ishizuka | ................ | B60K 1/04 |
| | | | | 180/89.1 |
| 4,377,300 A * | 3/1983 | Old | ................ | B62D 49/085 |
| | | | | 280/758 |
| 4,462,611 A * | 7/1984 | Sieren | ................ | B62D 49/085 |
| | | | | 280/759 |
| 4,518,047 A * | 5/1985 | Peterson | ............. | A01B 23/046 |
| | | | | 172/611 |
| 4,580,811 A * | 4/1986 | Wykhuis | ............. | B62D 49/085 |
| | | | | 280/759 |
| 4,586,847 A * | 5/1986 | Stanton | ................ | B02C 19/16 |
| | | | | 172/40 |
| 4,720,122 A * | 1/1988 | Brimeyer | ............. | B62D 49/085 |
| | | | | 280/759 |
| 4,854,772 A * | 8/1989 | Sinkkonen | ........... | E02D 3/026 |
| | | | | 296/193.04 |
| 4,971,356 A * | 11/1990 | Cook | ................ | B62D 37/04 |
| | | | | 280/759 |
| 5,462,309 A * | 10/1995 | Jeffers | ................ | E02F 9/18 |
| | | | | 187/222 |
| 5,690,360 A * | 11/1997 | Teich | ................ | B62D 49/085 |
| | | | | 172/611 |
| 5,993,110 A * | 11/1999 | Bueno | ............. | E01C 19/26 |
| | | | | 404/122 |
| 6,047,791 A * | 4/2000 | Hoebelheinrich | .... | B66F 9/0655 |
| | | | | 187/222 |
| 6,296,436 B1 * | 10/2001 | Ramun | ............. | E02F 9/18 |
| | | | | 212/195 |
| 6,311,781 B1 * | 11/2001 | Jerke | ................ | A62C 3/0292 |
| | | | | 169/62 |
| 6,471,245 B1 * | 10/2002 | Schott | ................ | B62D 49/085 |
| | | | | 280/759 |
| 6,533,319 B1 * | 3/2003 | Denby | ................ | A01B 59/06 |
| | | | | 172/439 |
| 7,147,250 B2 * | 12/2006 | Kubo | ................ | B62D 49/085 |
| | | | | 280/755 |
| 7,152,883 B2 * | 12/2006 | Niemela | ............. | B62D 49/085 |
| | | | | 280/757 |
| 7,281,737 B2 * | 10/2007 | Ellis | ................ | B60P 1/00 |
| | | | | 224/403 |
| 7,467,722 B2 * | 12/2008 | Ramun | ................ | B66C 23/72 |
| | | | | 212/178 |
| 7,607,692 B2 * | 10/2009 | Adams | ............. | B62D 49/0628 |
| | | | | 220/495.01 |
| 7,618,062 B2 * | 11/2009 | Hamm | ................ | B62D 49/085 |
| | | | | 280/759 |
| 7,658,293 B2 * | 2/2010 | Yamamoto | ............. | B66C 23/74 |
| | | | | 212/178 |
| 8,118,326 B2 * | 2/2012 | Moore | ................ | A01D 34/82 |
| | | | | 280/759 |
| 8,186,716 B2 * | 5/2012 | Connolly | ............. | B62D 25/20 |
| | | | | 280/759 |
| 8,196,690 B2 * | 6/2012 | Kunkel | ............. | B66F 9/07536 |
| | | | | 180/65.1 |
| 8,201,849 B2 * | 6/2012 | Bauer | ................ | B62D 49/0628 |
| | | | | 172/611 |
| 8,430,427 B1 * | 4/2013 | Gaeddert | ............. | B62D 49/085 |
| | | | | 212/195 |
| 8,636,299 B2 * | 1/2014 | Lindholm | ............. | B60R 99/00 |
| | | | | 172/611 |
| 8,662,460 B2 * | 3/2014 | Heimbuch | ............. | A01B 76/00 |
| | | | | 212/178 |
| 8,672,048 B2 * | 3/2014 | Crumpler, Jr. | ........ | A01B 59/048 |
| | | | | 172/611 |
| 8,960,460 B2 * | 2/2015 | Mentink | ................ | B66C 23/74 |
| | | | | 212/195 |
| 9,127,435 B2 * | 9/2015 | Bienfang | ................ | E02F 9/18 |
| 9,187,877 B2 * | 11/2015 | Imano | ................ | E02F 9/0866 |
| 9,469,947 B2 * | 10/2016 | Ries | ................ | E01C 19/26 |
| 9,481,556 B2 * | 11/2016 | Oishi | ................ | H01M 2/1083 |
| 9,689,144 B2 * | 6/2017 | Roden | ................ | B66C 23/72 |
| 9,702,250 B2 * | 7/2017 | Szpek, Jr. | ........... | B66F 9/07595 |
| 2002/0145277 A1 * | 10/2002 | Dombey | ................ | B62D 49/085 |
| | | | | 280/759 |
| 2003/0047928 A1 * | 3/2003 | Gosselin | ................ | B62D 37/04 |
| | | | | 280/759 |
| 2010/0073479 A1 * | 3/2010 | Uto | ................ | E02F 9/18 |
| | | | | 348/148 |
| 2015/0210330 A1 * | 7/2015 | Ezzat | ................ | B62D 25/082 |
| | | | | 296/190.01 |
| 2015/0259888 A1 * | 9/2015 | Yamanaka | ................ | E02F 9/18 |
| | | | | 414/719 |

FOREIGN PATENT DOCUMENTS

| | | | | |
|---|---|---|---|---|
| ES | 1054623 | 8/2003 | ............. | E01C 19/27 |
| GB | 842590 | 7/1960 | ............. | E01C 19/26 |
| JP | 2010-065434 | 3/2010 | ............. | E01C 19/27 |
| WO | WO 9638631 | 12/1996 | ............. | E01C 19/26 |
| WO | WO 2013096143 | 6/2013 | ............. | E01C 19/15 |

OTHER PUBLICATIONS

International Preliminary Report on Patentability issued in application No. PCT/BR2014/000395, dated Jun. 28 2016. (4 pgs).
Written Opinion of the International Search Authority issued in application No. PCT/BR2014/000395, dated Nov. 28, 2016. (3 pgs).

* cited by examiner

A

B

US 10,030,340 B2

MACHINE WEIGHT REGULATION SYSTEM

FIELD OF THE INVENTION

The present invention relates to the field of construction; specifically, to the field of machines, tools, or auxiliary devices for preparing or distributing paving materials, for handling the placed materials or to form, consolidate or finishing a paving.

STATE OF THE ART

Soil compaction is the method of mechanically increasing the density of the soil. In construction, this is an important part of the building process.

If performed improperly, it can give rise to a soil accommodation and cause unnecessary maintenance costs or even the loss of the structure. Almost all types of building work sites and construction designs use mechanical compaction techniques.

The desired level of soil compaction is best achieved by soil type combination with the appropriate compaction method. Factors, such as compaction specifications and site conditions of the work, should also be considered to choose the best type of soil compactor.

The compactor rollers are suitable for cohesive and granular soils. They may be of single or double type, and are available in smooth drum models, ram and rubber tires; and, moreover, they are divided into static and vibratory subcategories.

The compaction force in compactors is proportional to the weight of the compactor, and can be changed by adding or removing the ballast weight in that equipment. The ballast may be a metal block, or in the form of water or sand. Weight limits vary from 10 to 35 tons.

PI 9502171-0, of the same holder of this application, claims a modular ballast system to be fixed to the side of the compactor, preventing the use of other types of extra weight as sand and/or water. Moreover, in PI 9502171-0, the form of fitting of the modular ballast system on the chassis is quite complex, a fact that increases production of both the machine and the ballast itself.

The patent documents JP 2010-065434 and ES1054623 describe modular systems of made ballast and do not allow the use of other types of extra weight, such as sand and/or water. Furthermore, there is a shortage of flexibility of tuning of the ballast number, and there is not allowed to distribute the ideal load between the equipment axles. They also have as a feature the difficult handling of ballasts. In relation only to JP 2010-065434, another disadvantage lies on the difficulty of fastening the ballasts in the compactor.

An alternative to these patents has been published by WO2013096143 and is a ballast designed to be positioned on extensions at the lower part of the chassis of a compactor. These chassis extensions are open in the lower portion, a fact that prevents the use of water or sand as ballast. Other drawbacks occur because the load operation of the ballasts becomes complicated due to the fact that the ballast center of gravity is located above the forklift forks, and, furthermore, the forklift forks can jam during the loading of the ballasts.

Therefore, the prior art does not provide any solution to allow the improvement of the ballasting system of compactors, providing a safe and easy way of handling the employed ballast, and allowing the use of sand and/or water in the compactor ballast control.

SUMMARY OF THE INVENTION

The present invention is a machine weight regulation system that comprises one or more ballasts joined by a fastening system, and a machine containing housings; the machine is capable of carrying a plurality of types of extra weight, and enables that a better distribution of load between the front and rear axles on the machine is obtained.

BRIEF DESCRIPTION OF DRAWINGS

To obtain a full and complete view of the objects of this patent of invention, the following drawings, to which it reference are made, accompany the specification as below.

DETAILED DESCRIPTION OF THE INVENTION

Figure 1:
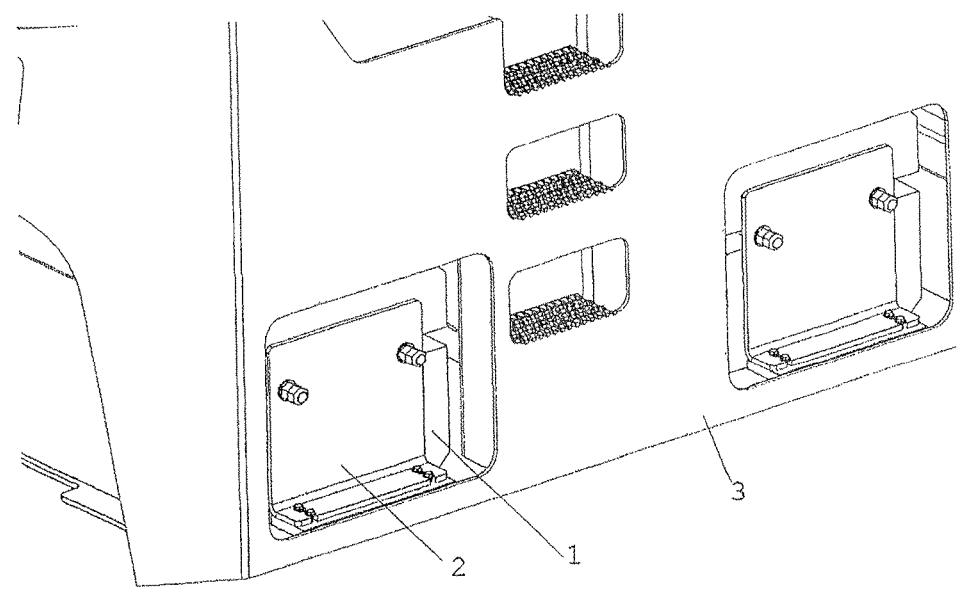
FIG. 1—a perspective view of the weight regulation system.

FIG. 1 illustrates the main components of the machine weight regulation system of the present invention comprising one or more ballasts (1); a fastening system (2); and a machine (3) containing housings; which is capable of carrying a plurality of types of extra weight.

Figure 2:
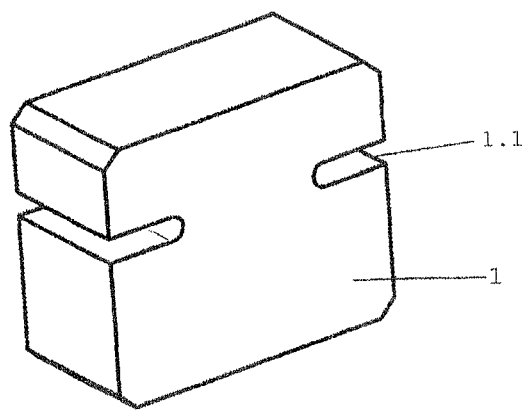
FIG. 2—A: is a perspective view of the ballast, and B: a lateral view of the fastening system.
Figure 2:
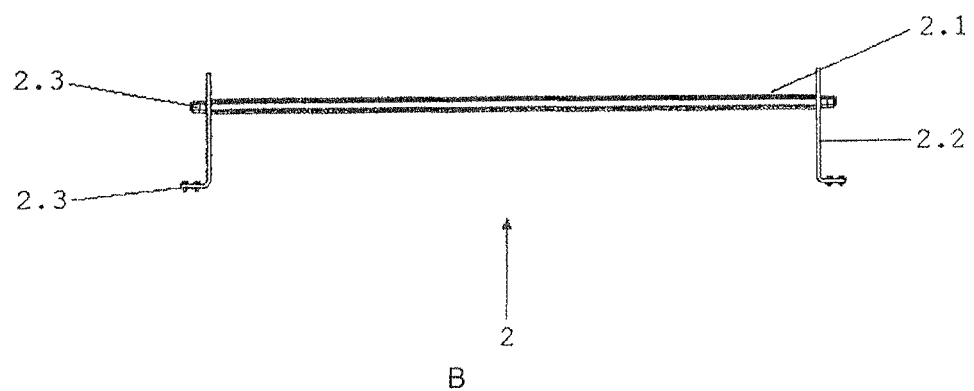
Figure 3:
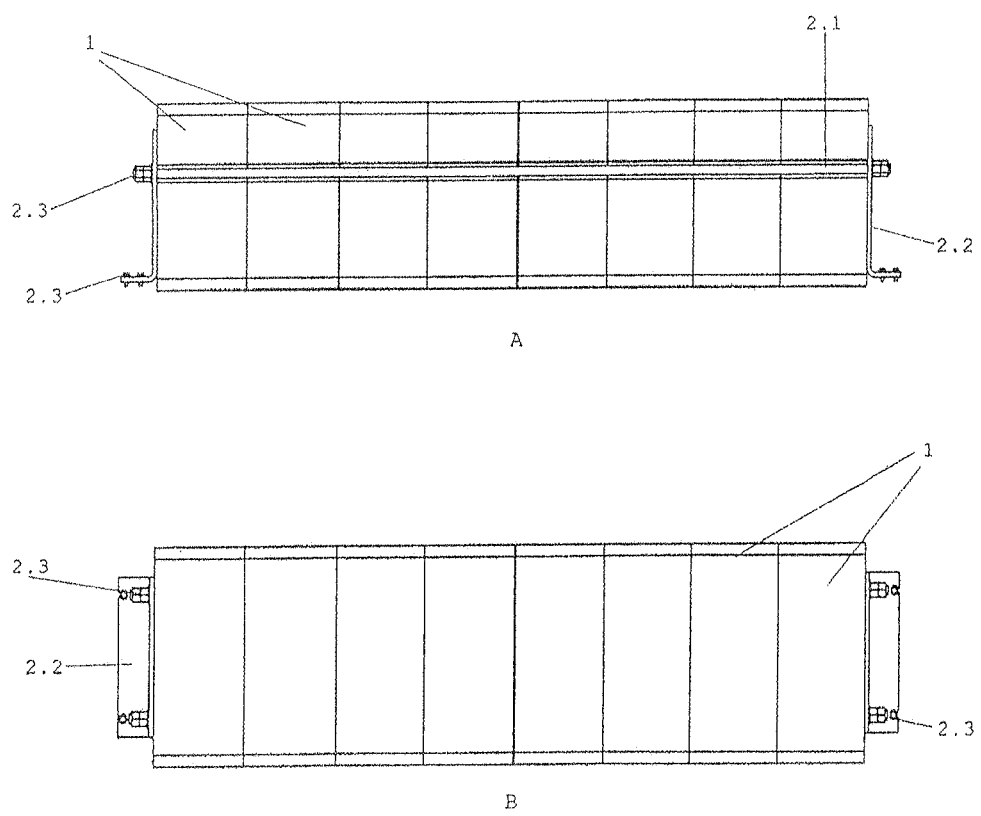
FIG. 3—ballasts with the fixation system; A: side view; B: top view.

As can be seen in FIGS. 2 and 3, the one or more ballasts (1) are regular metallic solids of from 400 to 600 kgf weight each; comprise a width between 40 and 60% lower than the measured length; and a height corresponding to between 10 and 20% lower than the measured length.

The lateral cuts (1.1) are located between the midpoint of the faces and apex of the edges, being thus located above the center of gravity of the ballast (1). The fixing system (2) is inserted between the lateral cuts (1.1) of each ballast keeping them together and secured to the machine (3).

The side cut (1.1) also serve as support for the forks of the forklifts used in loading the ballasts (1) on the machine (3).

Preferably, the one or more ballasts (1) are produced in solid steel.

In the preferred embodiment of the invention, the one or more ballasts (1) are between 1 to 20 ballasts (1) joined by the fastening system (2). Preferably the one or more ballasts (1) consists of between 4 and 16 ballasts (1) joined by the fastening system (2).

Still in FIGS. 2 and 3, it can be noted that the fastening system (2) consists of tie rods (2.1); fastening plates (2.2); and fasteners (2.3). The tie rods (2.1) are parallel to each other and longitudinally inserted in the lateral cuts (1.1) of the one or more ballasts (1).

The fastening plates (2.2) are provided with through holes coinciding with the lateral cuts (1.1); they are positioned at the ends of one or more ballasts (1) and are fixed to the final ends of the tie rods (2.1) and to the machine (3) by means of fasteners (2.3).

The fasteners (2.3) belong to the group consisting of nuts, washers, screws, or a combination thereof.

Figure 4A:
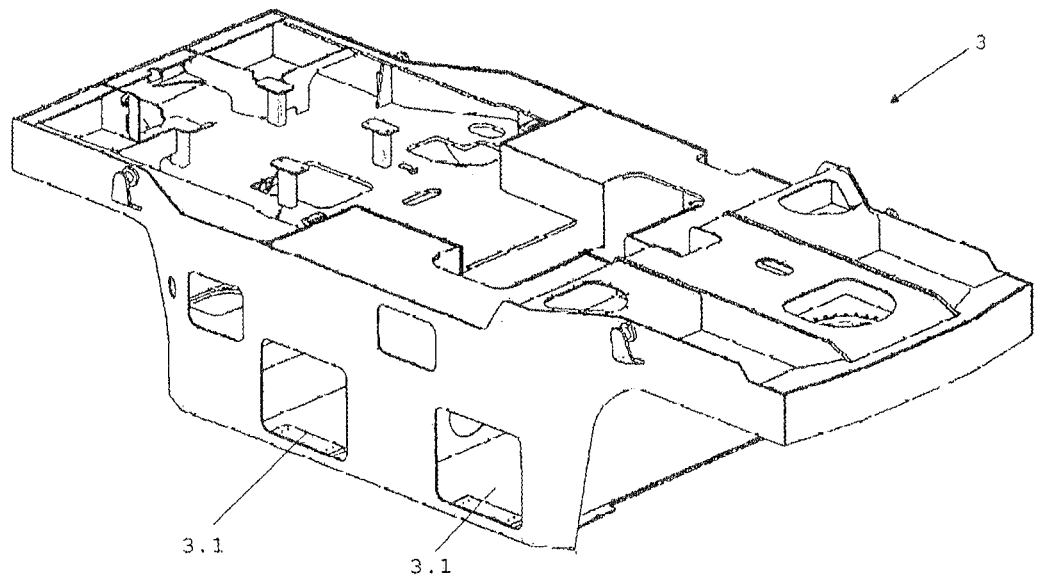
FIG. 4—a perspective view of the machine chassis of the machine weight regulation system; A: top view; B: Internal bottom view.
Figure 4B:
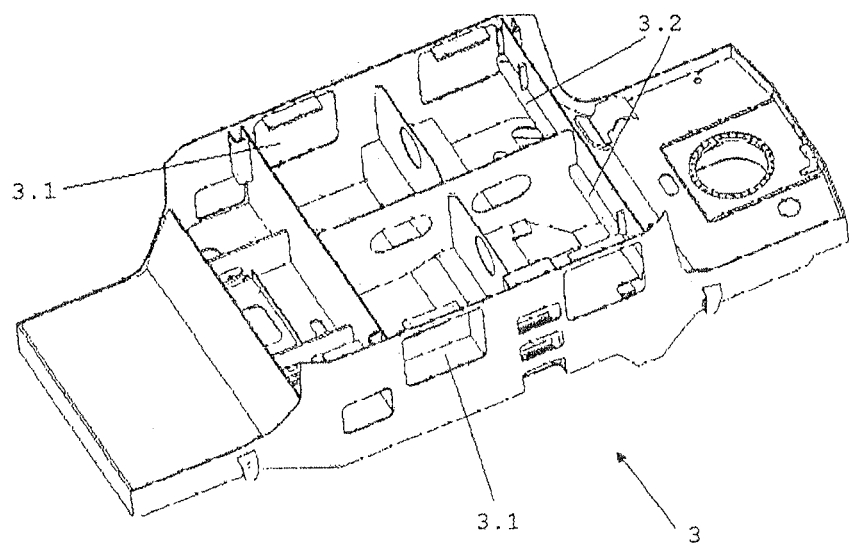
Figure 5:
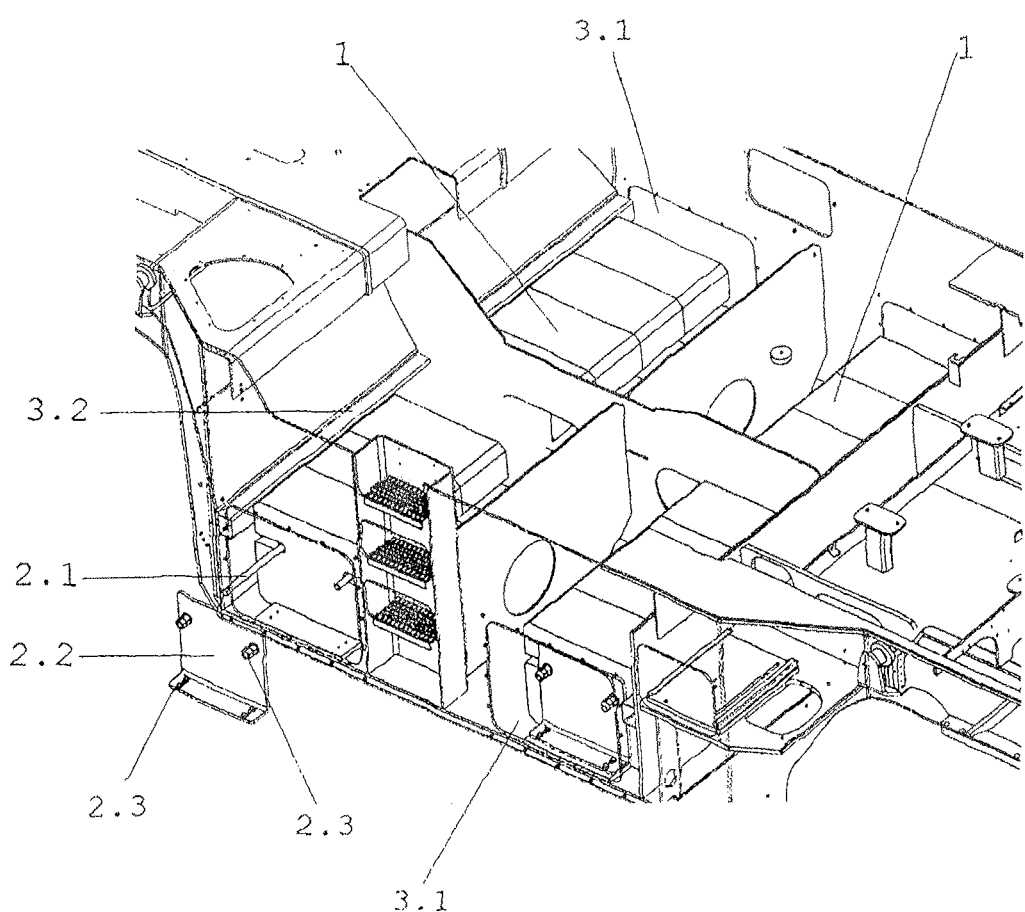
FIG. 5—perspective view of the machine weight regulation system.
Figure 6:
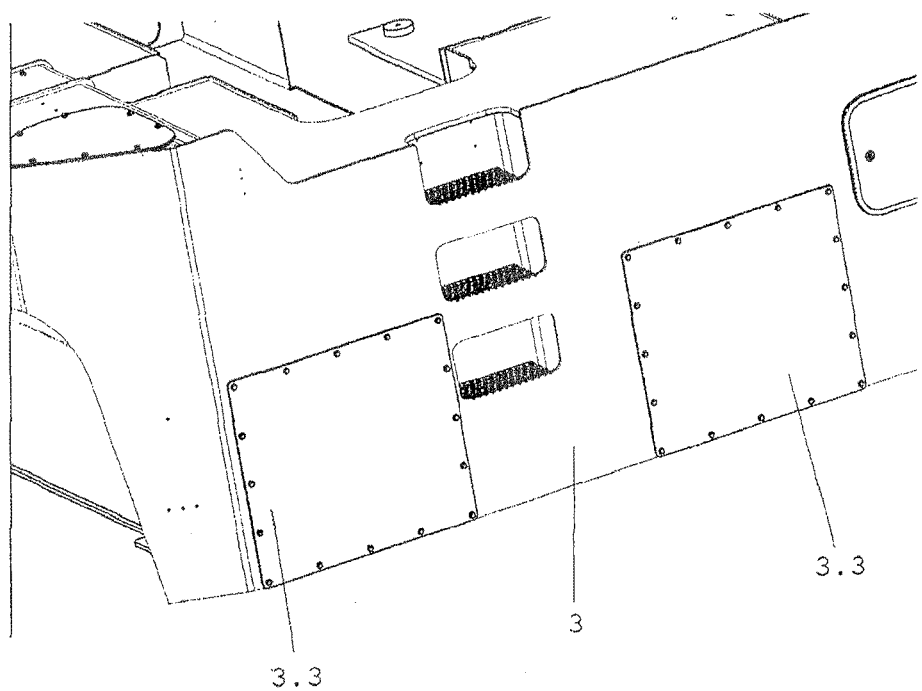
FIG. 6—external view of the machine chassis.

By FIGS. 4, 5 and 6 it is observed that the machine (3) comprises the housings (3.1), the stops (3.2) and the housing cover (3.3).

In FIG. 4A it can be noted that the housings (3.1) are located in the lower middle third of the chassis and between the front and rear rotating axles of the machine (3) and serve to store an extra weight.

The housings (3.1) are divided into four interconnected sections, as can be best viewed in FIGS. 4B and 5. The division into sections allows a better distribution of extra weight by the machine. Thus, a different amount of extra weight on the front or rear of the machine (3) can be stored, as needed.

The stops (3.2) serve to properly position the one or more ballasts (1) in the housing (3.1), and as structural reinforcement for the chassis of the machine (3).

FIG. 6 shows that the housing cover (3.3) makes the housing (3.1) sealed and allows that different types of extra weight are stored within each housing (3.1). The housing cover (3.3) is fixed to the chassis by means of clips, nuts, washers, screws, or a combination thereof.

In the preferred embodiment of the invention, in each of the housings (3.1) is stored an extra weight, consisting of from 1 to 20 ballasts (1) joined by the fastening system (2). Preferably, an extra weight is stored consisted of between 4 and 16 ballasts (1) joined by the fastening system (2).

In this invention, the machine (3) is any machine that needs the help of an extra weight to have its weight set and belongs to the group consisting of: roller compactor; pneumatic tire compactor, forklift, and others.

In an alternative embodiment of the invention, each of the housings (3.1) an extra weight is stored that consists of from 1 to 20 ballasts (1) joined by the fastening system (2).

While the invention has been extensively described, it is obvious to those skilled in the art that various changes and modifications may be made without these modifications are not covered by the scope of the invention.

The invention claimed is:

1. A machine weight regulation system, comprising one or more ballasts, a fastening system, and a machine containing housings;
    wherein the fastening system comprises tie rods, fastening plates, and fasteners;
    wherein the one or more ballasts comprise lateral cuts adapted to accommodate the tie rods, wherein the tie rods are arranged parallel to each other and longitudinally inserted in said lateral cuts;
    wherein said lateral cuts of the one or more ballasts are adapted to serve as support for forks of forklifts used in loading the one or more ballasts on the machine;
    wherein the housings of the machine are divided into four interconnected sections, wherein said housings are located in the lower middle third of the chassis and between the front and rear rotating axles of the machine; and
    wherein the housings cooperate with housing covers which are adapted to seal each housing, and which cooperate with a lateral chassis surface of the machine so that the one or more ballasts positioned in the housings are inserted therein through the lateral sides of the vehicle.

2. The machine weight regulation system, according to claim 1, wherein the one or more ballasts are metallic solids of from 400 to 600 kgf weight each; comprise a width between 40 and 60% lower than a measured length; and a height corresponding to between 10 and 20% lower than the measured length; and the lateral cuts located between a midpoint of the faces and an apex of edges thereof.

3. The machine weight regulation system, according to claim 2, wherein the one or more ballasts are joined by the fastening system.

4. The machine weight regulation system, according to claim 1, wherein the fastening plates are provided with through holes coinciding with the lateral cuts and are positioned at the ends of one or more ballasts and are fixed to the final ends of the tie rods and to the machine using fasteners.

5. The machine weight regulation system, according to claim 1, wherein the fasteners are selected from the group consisting of nuts, washers and screws, and a combination thereof.

6. The machine weight regulation system, according to claim 1, wherein the machine further comprises stops.

7. The machine weight regulation system, according to claim 6, wherein the stops are adapted to properly position the one or more ballasts in the housings, and as structural reinforcement for the chassis of the machine.

8. The machine weight regulation system, according to claim 6, wherein in each of the housings an extra weight is stored that consists of from 1 to 20 ballasts joined by the fastening system.

9. The machine weight regulation system, according to claim 6, wherein in each of the housings an extra weight is stored that consists of sand, water and ballast, and a combination thereof.

10. The machine weight regulation system, according to claim 1, wherein the housing covers allow for storage of different types of extra weight within each housing.

11. The machine weight regulation system, according to claim 10, wherein the housing covers are fixed to the chassis using clips, nuts, washers and screws, or a combination thereof.

12. The machine weight regulation system, according to claim 1, wherein the machine is selected from the group consisting of: a roller compactor; a pneumatic tire compactor and a forklift.

* * * * *